Patented Dec. 30, 1924.

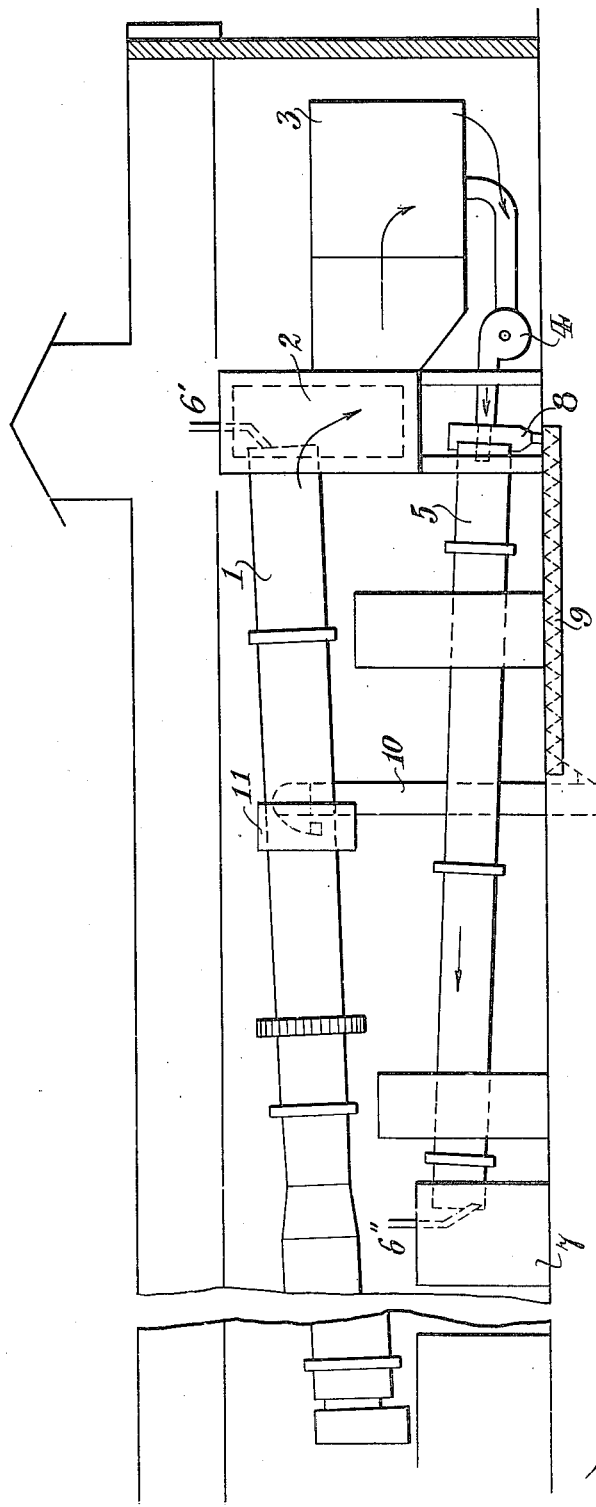

1,521,129

UNITED STATES PATENT OFFICE.

EINAR RØNNE, OF COPENHAGEN, DENMARK, ASSIGNOR TO F. L. SMIDTH & CO., OF NEW YORK, N. Y., A CORPORATION OF NEW JERSEY.

PROCESS AND APPARATUS FOR UTILIZATION OF THE COMBUSTION GASES FROM ROTARY CEMENT-BURNING KILNS.

Application filed January 6, 1923. Serial No. 611,200.

*To all whom it may concern:*

Be it known that EINAR RØNNE, a subject of the King of Denmark, residing at Copenhagen, Denmark, has invented certain new and useful Improvements in Processes and Apparatus for Utilization of the Combustion Gases from Rotary Cement-Burning Kilns, of which the following is a specification.

In the use of rotary cement burning kilns adapted for the burning of slurry or raw materials, which contain water there will always be, when the gases or products of combustion have left the burning zone, the carbon-dioxide expelling zone, and the heating zone of the kiln, more heat available in the gases which are then discharged or the waste gases than would be required to evaporate the moisture contained in the raw materials. Even in case the raw materials, after wet preliminary treatment, are supplied to the kiln in a semi-liquid state or as slurry, the waste gases will leave the kiln with a quite considerable surplus of heat.

Various methods of utilizing this surplus of heat in the waste gases have been proposed, as, for instance, to dry a surplus of raw material in the kiln to be burned in a separate kiln, to divert a quantity of combustion gases corresponding to the surplus quantity of heat by way of suitably located openings in the wall of the kiln, or to cut the kiln in two between the burning zone and its gas discharge end, and to connect at such point a flue to conduct the surplus gases to a boiler plant or the like for the utilization of the surplus heat.

A drawback common to these methods is that they involve a complication of the plant. The first mentioned method causes the plant to be quite costly, inasmuch as two kilns are required and the second and third methods involve the drawback that devices must be provided at the point where the gases are diverted from the rotary kiln proper adapted to catch the gases and direct them from the kiln into the flue for the diverted gases, or from the burning zone of the kiln into the drying zone of the same. Such devices involve great practical difficulties.

The present invention supplies a solution of the problem by which the above mentioned surplus heat becomes easily accessible for various uses in a manner giving a quite simple and cheap plant and, furthermore, obviating the practical difficulties alluded to and accompanying losses due to entrance of air, which are, as mentioned above, the principal drawbacks of the known methods.

According to the present invention the problem is solved by drying by means of the waste or surplus gases a portion of the moist raw material to be burnt in the kiln, outside of that portion of the kiln which is traversed by the combustion gases and then delivering this separately dried material into the kiln preferably at the point where the remainder of the material which has been fed directly to and dried in the kiln is in a similar state. It will thereby result that the combustion gases will leave the kiln at a higher temperature than otherwise because such gases have not given up their heat in drying that part of the raw material which has been dried outside the kiln.

A kiln plant in which the invention can be practiced is illustrated diagrammatically on the drawing.

The kiln 1, into which a portion of the slurry is delivered by way of a chute 6 ends at its upper end in a chamber 2, from which the entire volume of hot combustion gases is directed to a boiler plant 3 in which steam is generated by the heat contained in the combustion gases, the temperature of the latter becoming reduced during the passage from the chamber 2 to the outlet from the boiler plant. The still hot combustion gases from the boilers are directed, by means of a fan 4, through an obliquely disposed drying drum 5 into the upper end of which the remainder of the slurry to be burned in the kiln is fed through a chute 6″, while the combustion gases after having dried this material leave the drum by way of a dust chamber 7, into which the upper end of the drum projects. The dried material discharged from the lower end of the drum, is received in a chamber 8, from which a worm conveyor 9 and an elevator 10 lift it up to the burning kiln proper, into which it enters by way of openings in the shell encircled by a stationary shell 11. The point at which the material which has been dried outside the kiln is introduced into the kiln is so selected that the portion of the raw material fed directly to the kiln will be in a state similar as to temperature and dryness as that portion which has been dried outside the kiln is introduced into it.

While the temperature of the combustion gases from an ordinary burning kiln for cement slurry is from 400° to 500° C. the temperature of the waste gases of a plant such as the one described may be maintained as high as about 800° C. in front of the boilers. In the latter the temperature may be reduced to about 350° and in the drying drum there may be a further drop of temperature to about 150° C.

Having now particularly described and ascertained the nature of my said invention and in what manner the same is to be performed I declare that what I claim is:—

1. The process for utilization of the heat content of the combustion gases from rotary burning kilns for moist raw material, in which a portion of the raw material is subjected directly to the drying action of the combustion gases in the kiln and another portion is subjected externally of the kiln to the drying action of the waste combustion gases and is then mingled with the first portion in the kiln in a similar state.

2. The process as described in claim 1 and further characterized by the fact that the temperature of the waste gases is reduced before such gases are applied to the drying of the second portion of the raw material.

3. The combination of a clinkering kiln, a drying drum, means to conduct combustion gases from the kiln to the drum, means to feed raw material to the kiln, means to feed other raw material to the drum, and means to deliver the dried material from the drum to the kiln at an intermediate point where the material in the kiln has been brought to the same state as the material from the drum.

4. The combination of a clinkering kiln, a drying drum, means to conduct combustion gases from the kiln to the drum, means to feed raw material to the kiln, means to feed other raw material to the drum, means to deliver the dried material from the drum to the kiln at an intermediate point where the material in the kiln has been brought to the same state as the material from the drum, and means to reduce the temperature of the combustion gases in the passage of the same from the kiln to the drum.

In testimony whereof I have affixed my signature, December 9, 1922.

EINAR RØNNE.